United States Patent
Spears

[19]

[11] Patent Number: 5,876,088
[45] Date of Patent: *Mar. 2, 1999

[54] FAIRING ASSEMBLY HAVING DOOR OPENINGS THEREIN

[76] Inventor: Dan E. Spears, 3515 Westfield Dr., Brandon, Fla. 33511

[ * ] Notice: The term of this patent shall not extend beyond the expiration date of Pat. No. 5,653,493.

[21] Appl. No.: 873,306

[22] Filed: Jun. 11, 1997

Related U.S. Application Data

[63] Continuation-in-part of Ser. No. 659,079, Jun. 3, 1996, Pat. No. 5,653,493, which is a continuation-in-part of Ser. No. 351,800, Dec. 8, 1994, Pat. No. 5,522,637, Ser. No. 351,831, Dec. 8, 1994, Pat. No. 5,536,062, and Ser. No. 352,515, Dec. 9, 1994, Pat. No. 5,595,419.

[51] Int. Cl.⁶ ................................................. B62D 35/00
[52] U.S. Cl. ...................................... 296/180.5; 296/180.2
[58] Field of Search ............................ 296/180.1–180.5, 296/901, 202; 180/903

[56] References Cited

U.S. PATENT DOCUMENTS

| | | | |
|---|---|---|---|
| 2,356,624 | 8/1944 | Schulz et al. | 296/901 |
| 4,017,117 | 4/1977 | Eggert | 296/901 X |
| 4,627,655 | 12/1986 | Collins | 296/901 X |
| 5,092,648 | 3/1992 | Spears | 296/180.3 |
| 5,516,178 | 5/1996 | Grant | 296/180.5 |
| 5,653,493 | 8/1997 | Spears | 296/180.2 |

*Primary Examiner*—Dennis H. Pedder

[57] ABSTRACT

The disclosure explains shell assemblies having door openings therein wherein the shell assemblies have structural characteristics which provide for the structural integrity of the shell assemblies. Integrity strengthening means to provide for the structural integrity of the shell assemblies are fully explained. Generally, such strengthening of the shell assemblies involve surface directional changes bordering each door opening at least at a forward extent and at a rearward extent thereof. Door panels are then pivotally mounted within the door openings of the shell assemblies to form fairings. The pivotal nature of the door panels provide for the selective redirection of air flow through the door openings for useful purposes which include exerting a braking effect upon a transport vehicle upon which the fairing is mounted. Concealment of all connection elements while all door panels are in their respective closed positions is provided. Side extenders provide for the unique redirection of additional air flow which passes along the opposing sides of the fairing and which therefore may not be redirected by the door panels to pass through the door openings.

11 Claims, 15 Drawing Sheets

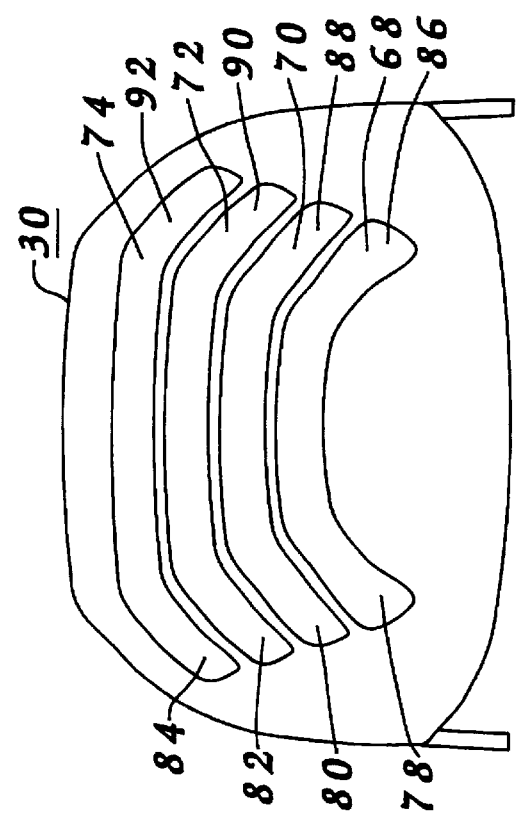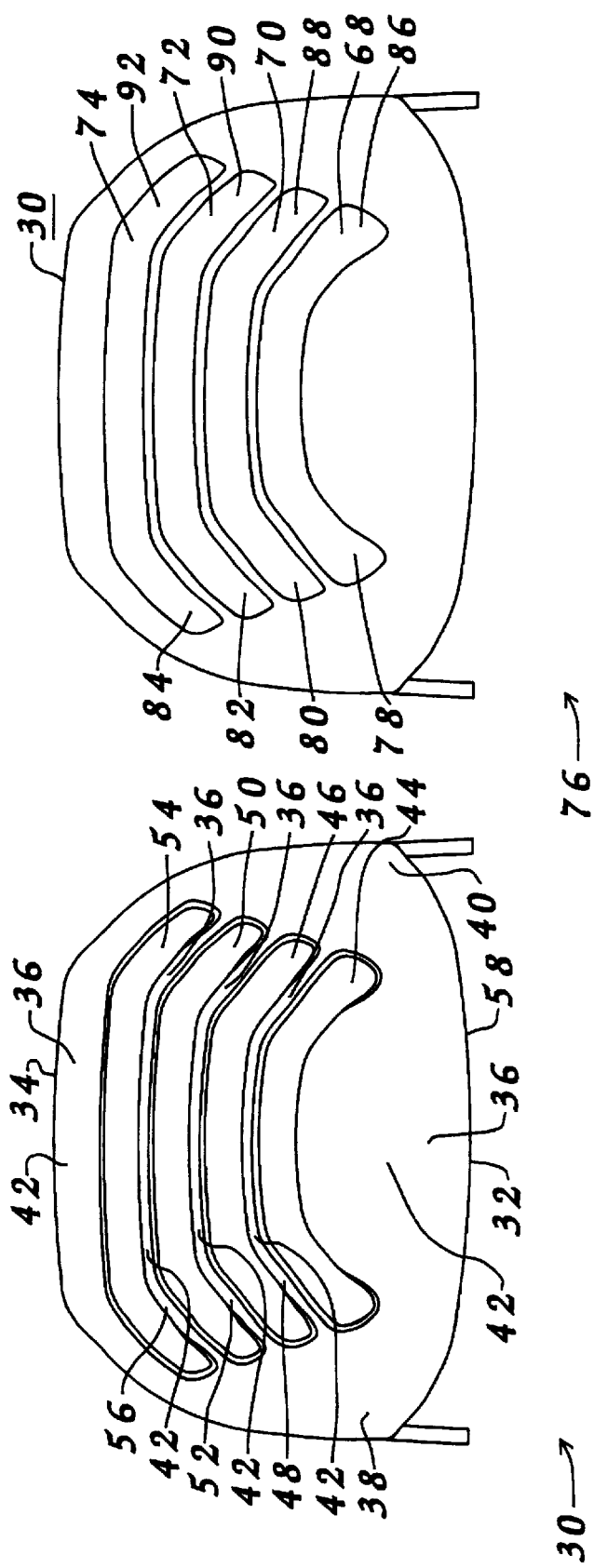

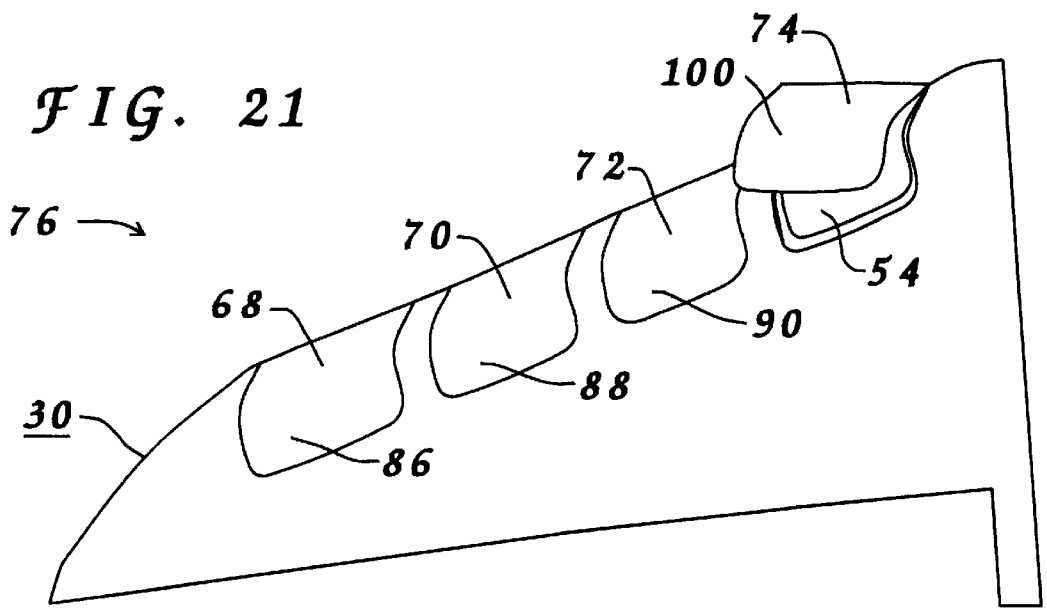
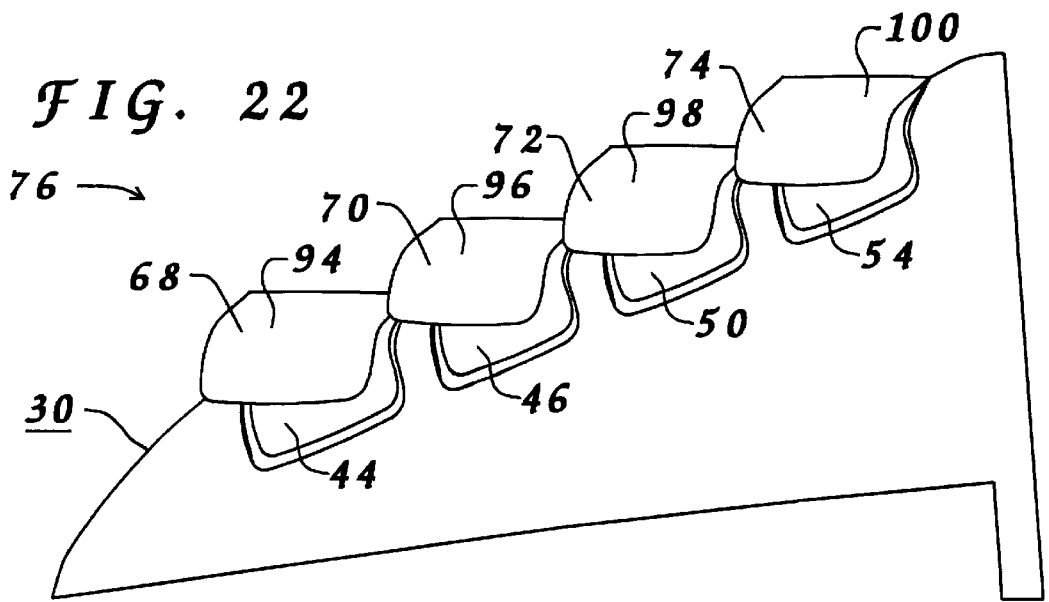

FAIRING ASSEMBLY HAVING DOOR OPENINGS THEREIN

CROSS-REFERENCES

This application is a continuation-in-part application of: U.S. Ser. No. 08/659,079, filed Jun. 3, 1996 and entitled "Shell Assembly Having Planar Surfaces Thereon", Now U.S. Pat. No. 5653,493, which is a continuation-in-part application of the following three U.S. Patents: 1) U.S. Pat. No. : 5,522,637, issued Jun. 4, 1996, Ser. No. 08/351,800, filed Dec. 8, 1994 and entitled "Auxiliary Braking Panels for a Tractor Trailer Combination", and, 2) U.S. Pat. No. : 5,536,062, issued Jul. 16, 1996, Ser. No. 08/351,831, filed Dec. 8, 1994 and entitled "Cross Wind Conditioning for a Tractor Trailer Combination", and, 3) U.S. Pat. No. : 5,595,419, issued Jan. 21, 1997, Ser. No. 08/352,515, filed Dec. 9, 1994 and entitled "Segmented Air Deflector Assembly". All of these applications are incorporated herein by this reference.

BACKGROUND

1. Field of the Invention

Generally, the invention relates to aerodynamic fairings. More specifically, the invention relates to such fairings having a shell assembly having a plurality of openings therein and a plurality of door panels pivotally mounted within those opening.

2. Description of the Prior Art

Tractor trailer combinations are plentiful along highways and are utilized to transport vast quantities of materials and goods. The tractor contains a motor, generally diesel fueled, which in turn provides the power which enables the tractor trailer combination to be propelled along a desired path. The trailer provides storage space to house materials and goods.

It has long been a desire to provide for an aerodynamic fairing assembly having characteristics which permit a selective redirection of air flow. Numerous attempts have been made, include applicant's earlier patents, to provide for such redirection of air flow. Generally, these attempts have involved either; 1) the modification of existing fairings by cutting openings therein and the subsequent mounting of doors in the created openings or, 2) construction of a structural frame upon which various panels were attached, both pivotally and fixedly, which then cooperated to form the fairing.

Several efforts have been made in regard to the former group, being the modification of existing fairings. These efforts have been significantly hampered as a result of a general weakening of the structural integrity of the modified fairings. Attempts have been made, at least in practice if not in the art, to strengthen the fairings around the openings cut therein. These efforts are exampled by attaching structural frame assemblies around each opening. These efforts have been hampered by the requirement of penetrating the fairing adjacent the opening to permit penetrating securement members, as exampled by bolts, to bind the structural frame assemblies to the fairing. This requirement produced two (2) adverse effects. The first adverse effect being a further degradation of the structural integrity of the fairing as a direct result of multiple penetrations of the fairing around each of the openings. The second adverse effect has been a reduction in the aesthetic appeal of the resulting fairing. This results from the reinforcement securement members, situated around each of the openings, being exposed to outside view without regard for whether or not the doors are opened or closed. The term outside view as used herein is designed to define viewing from the sides or the front of the installed fairing. It being understood that normally the rear of a particular fairing will be open providing a view of any components contained therein which are not observable under the definition of outside view.

Applicant's earlier efforts have been directed primarily toward the later group, being the frame and plural panel assembly. A primary drawback of these units has been the unique appearance of the resultant fairing. While aesthetically appealing in their own right, the resultant fairings did not conform in appearance to those fixed fairings provided specifically for select models of tractor and widely accepted in the industry. This lack of conformity to existing standards has reduced the acceptance of such units within the industry.

Various attempts have been made to provide a fairing having displaceable door panels therein which permit a redirection of the air flow for various productive uses. These attempts have been less efficient than desired.

Your applicant is unaware of the manufacture of fairing shell assemblies having openings therein for the pivotal mounting of door panels to provide for the selective redirection of air flow while maintaining the structural integrity of the fairing shell assembly in light of the openings therein. As such, it may be appreciated that there continues to be a need for fairing shell assemblies having openings therein wherein the shell assemblies have features which ensure the structural integrity of such assemblies without requiring secondary reinforcement framing assemblies attached thereto. The present invention substantially fulfills these needs.

SUMMARY

In view of the foregoing disadvantages inherent in the known methods of providing fairings with door openings therein, your applicant has devised a fairing shell assembly having a plurality of door openings therein while providing for the structural integrity of the fairing shell assembly by providing for unique structurally enhancing members to at least partially surround each door opening. These structurally enhancing members include a forward brace member and a rearward brace member. The forward brace member has a receding surface while the rearward brace member has a door mounting surface. Preferably, the forward brace member and the rearward brace member are intricately formed into the fairing shell assembly at the time of manufacture.

My invention resides not in any one of these features per se, but rather in the particular combinations of them herein disclosed and it is distinguished from the prior art in these particular combinations of these structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore a primary object of the present invention to provide for a manufactured shell assembly, which has openings therein, which has a high level of structural integrity.

Other object include;

a) to provide for door panels to be pivotally installed within the openings of the shell assembly.

b) to provide for an aesthetically appealing shell assembly while door panels, pivotally mounted in the openings, are in a closed position.

c) to provide for an aesthetically appealing shell assembly while door panels, pivotally mounted in the openings, are in an open position.

d) to provide for all pivotal members utilized to cause the door panels to be pivotally secured to the shell assembly to be concealed from outside view while the door panels are in the closed position.

e) to provide for all fastening members utilized to secure the pivotal members to the shell assembly to be concealed from outside view while the door panels are in the closed position.

f) to provide for all fastening members utilized to secure the door panels to the pivotal members to be concealed from outside view while the door panels are in the closed position.

g) to provide for a forward brace member to border each opening in the shell assembly.

h) to provide for a rearward brace member to border each opening in the shell assembly.

i) to provide for a single crossing member between adjacent openings to contain the forward brace member of the rearward opening and the rearward brace member of the forward opening.

j) to provide for each forward brace member to have a receding surface and a seating surface thereon.

k) to provide for each rearward brace member to have a door mounting surface and a coupling surface thereon.

l) to provide for opposing side extenders to pivotally attach rearward of the fairing assembly to provide for additional air flow redirection.

m) to provide for each respective side extender to pivotal from a vertically oriented axis line wherein the axis line is between a forward edge of the side extender and a rearward edge of the side extender.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated the preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein;

FIG. 1 through FIG. 6 are views of a shell assembly having features of the present invention.

FIG. 1 is a top plan view.

FIG. 2 is a top plan view with door panels installed in the shell assembly to form a fairing assembly.

FIG. 3 is a front elevational view.

FIG. 4 is a front elevational view with door panels installed in the shell assembly to form the fairing assembly.

FIG. 5 is a side elevational view.

FIG. 6 is a side elevational view with door panels installed in the shell assembly to form the fairing assembly.

FIG. 7 is a top plan view.

FIG. 8 is a front elevational view.

FIG. 9 is a side elevational view.

FIG. 19 through FIG. 22 are a series of side elevational views of a fairing assembly depicting various relational positions of select door panels.

DESCRIPTION

Figure 2:
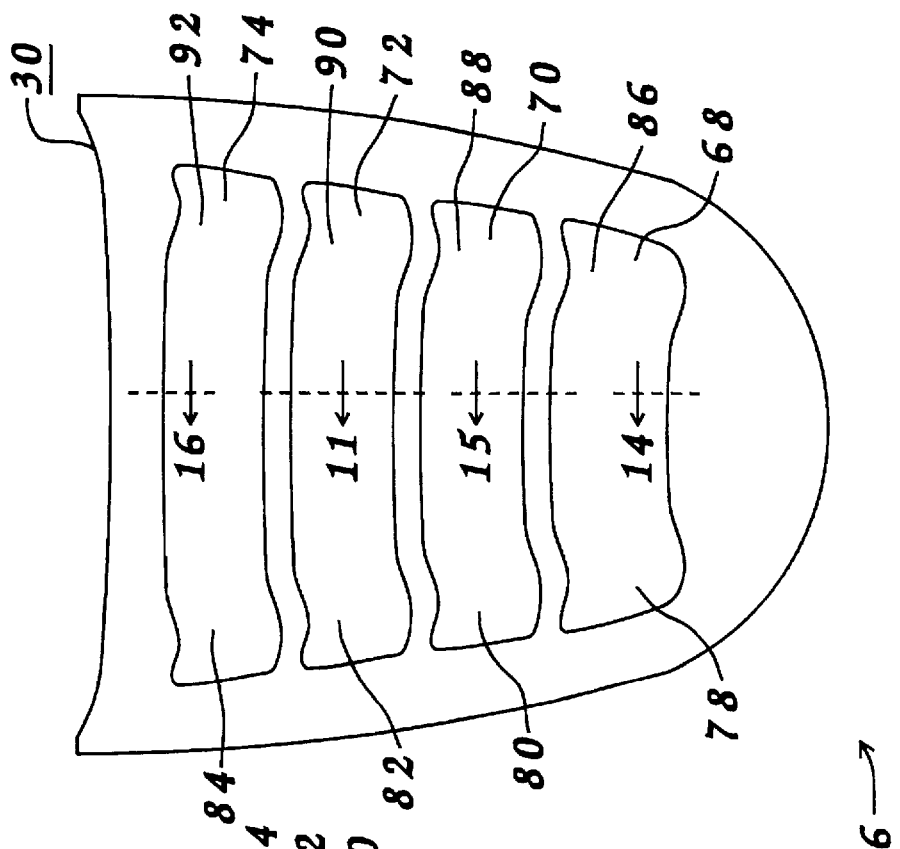

Reference is now made to the drawings where like reference numerals refer to like parts throughout the various views.

Shell Assembly

Conventional fixed fairings are generally of a one piece construction. It is known in the art to provide for sectional components within fixed fairings where at least one select component, as exampled by a front nose section, is uniform to all produceable fairings within that specific series. The remaining components include a series of interchangeable rearward side and upper sections attachable to the uniform component. Such selection being dependent upon such desired results as the rearward most dimensions, including relative placement to the uniform component and widths and heights.

Shell assemblies having features of the present invention similarly may be of a one piece construction or may be formed of select sections. The entire shell assembly, or all components thereof, can easily be facilitated by any of the methods conventionally known in the art. One of the most common method used in the field to manufacture fixed conventional fairings is to form such fairings using fiberglass sheet material and a resin material in a mold. Shell assemblies having the desired door openings therein, as well as the door panels proper, may easily be manufactured using this existing technology. Shell assemblies so manufactured provides for a lightweight construction which are capable, due to the incorporation therein of the integrity strengthening elements disclosed below, of extreme strength. This type of manufacture produces shell assemblies and door panels each having a thin wall construction. Other types of manufacture will also produce shell assemblies and door panels each having a thin wall construction. When a molding manufacturing method is employed it is necessary to ensure angular orientation of all surfaces thereon to ensure that the formed component will release from the mold. The examples which follow employ such orientation.

The door panels may be mounted in their respective openings with portions of the attachment hardware which are utilized to attach the pivotal connection members to the shell assembly visible from outside view while the door panels are in their respective closed positions. Attachment concealment means may provide for a concealment of all exposed attachment hardware visible from outside view on the resultant fairing while all of the doors are in their respective closed positions. Therefore, preferably structures will exist on the shell assembly to provide for a concealment of all portions of the attachment hardware utilized to attach the pivotal connection members to the shell assembly while the door panels are in their respective closed positions. Similarly, it is preferred to provide for a concealment of all portions of the attachment hardware utilized to attach displacement components to the shell assembly while the door panels are in their respective closed positions. Examples of such structures follow. Such concealment placement affords the greatest consistency of appearance possible relative to existing fixed fairings which are widely accepted in the industry.

Figure 1:
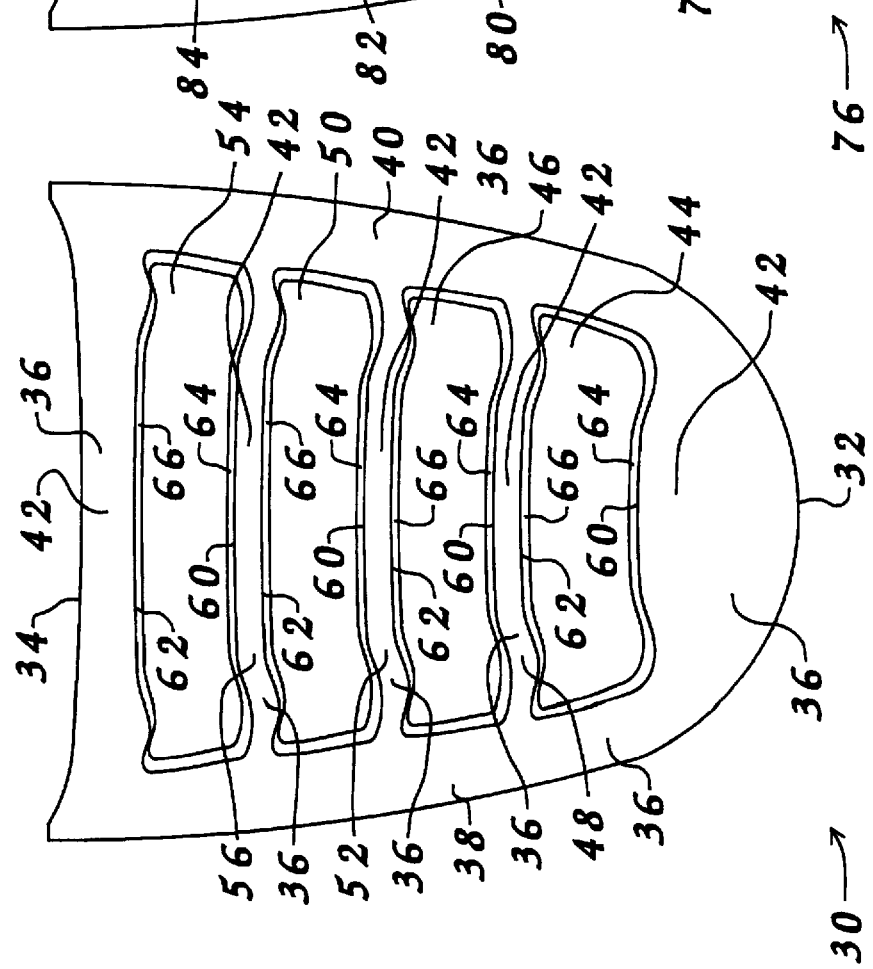
Figure 6:
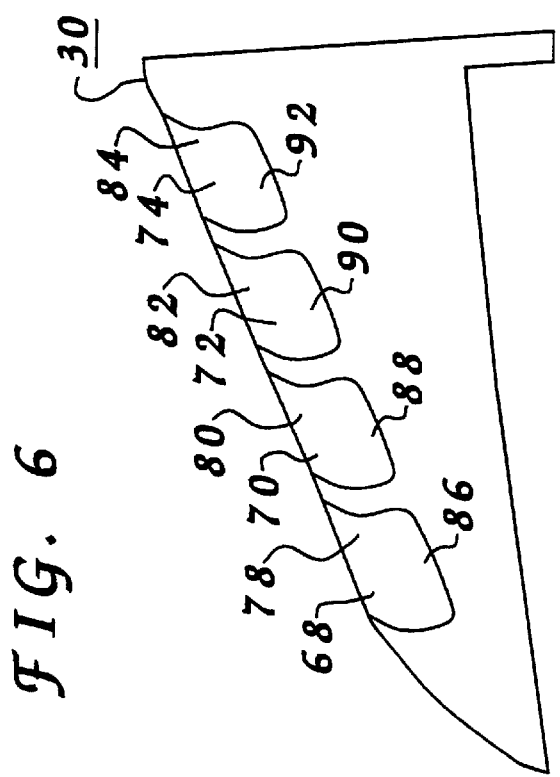
Figure 5:
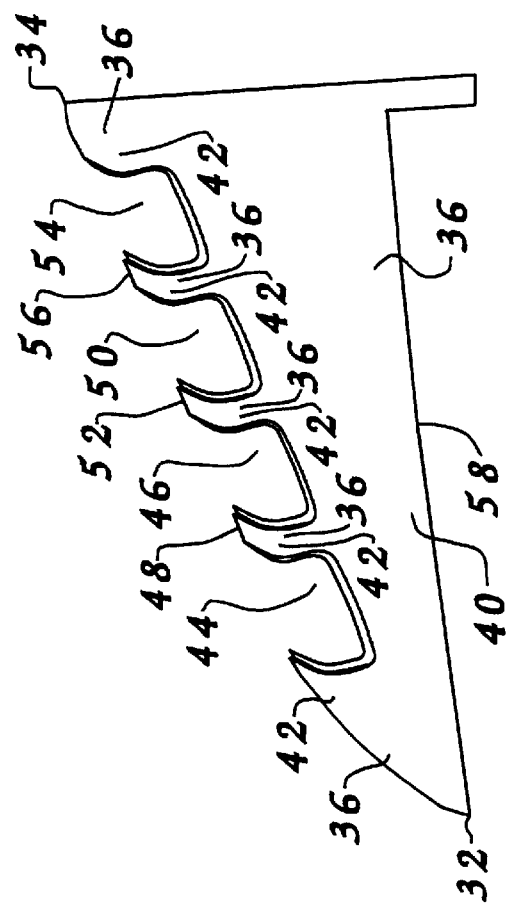
Figure 7:
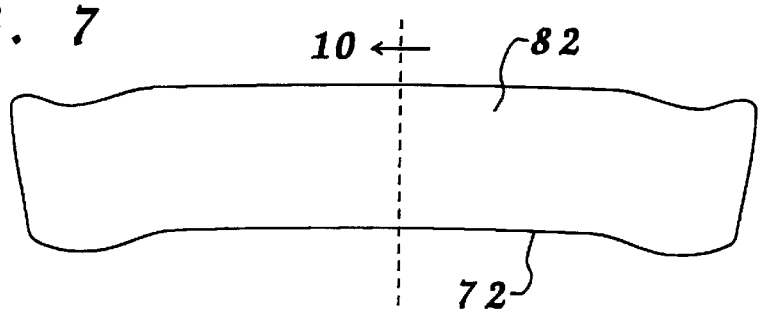
FIG. 7 through FIG. 9 are views of a door panel.
Figure 8:
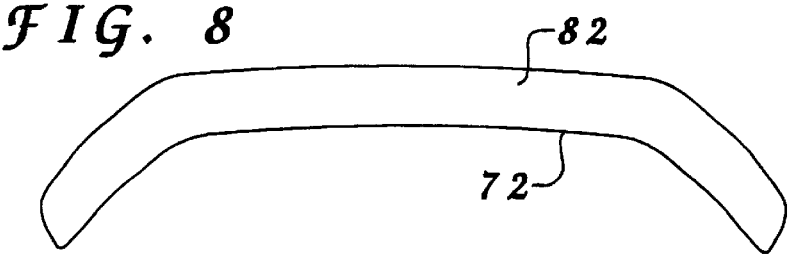
Figure 9:
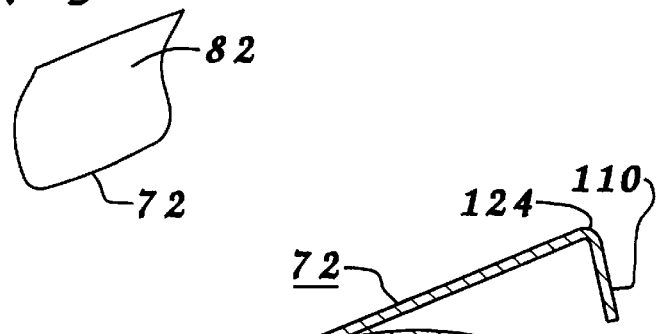

FIG. 1, FIG. 3 and FIG. 5 depict a shell assembly 30 having a forward extent 32 and a rearward extent 34 situated at longitudinally opposing ends with an outer surface 36 situated therebetween. Outer surface 36 comprises all surfaces on shell assembly 30, following installation of the door panels described below, visible from the outside view while those door panels are in a closed position, also described below. An outer right side 38 and an outer left side 40 extend from forward extent 32 to rearward extent 34 on opposing sides of shell assembly 30. The term outer used herein refers to the areas or surfaces visible from outside view. An outer central region 42 extends from outer right side 38 laterally across to outer left side 40 along the entire longitudinal length from forward extent 32 to rearward extent 34 of shell assembly 30. As clearly depicted in FIG. 3 and FIG. 5, outer central region 42 increases in elevational height from forward extent 32 to rearward extent 34.

A first opening 44 penetrates outer central region 42 adjacent forward extent 32. A second opening 46 penetrates outer central region 42 rearward from first opening 44. A first crossing member 48 separates first opening 44 from second opening 46. A third opening 50 penetrates outer central region 42 rearward from second opening 46. A second crossing member 52 separates second opening 46 from third opening 50. A fourth opening 54 penetrates outer central region 42 rearward from third opening 50. A third crossing member 56 separates third opening 50 from fourth opening 54. Each crossing member 48, 52 or 56 has a surface which is part of outer surface 36 of shell assembly 30. A lower extent 58 of shell assembly 30 may be of any desired dimensional orientation to provide for ready attachment to a specific make and model of transport vehicle.

Openings

Figure 26:
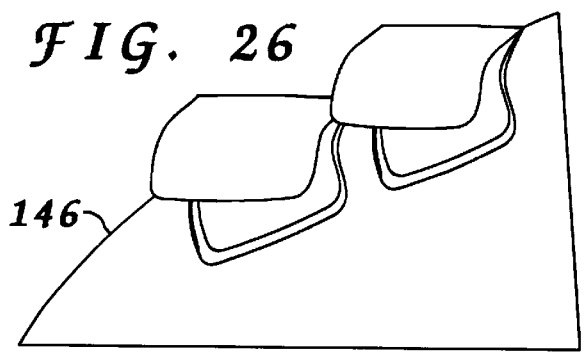
FIG. 26 is a side elevational view of the fairing shown in FIG. 25 with the door panels in an open position.
Figure 28:
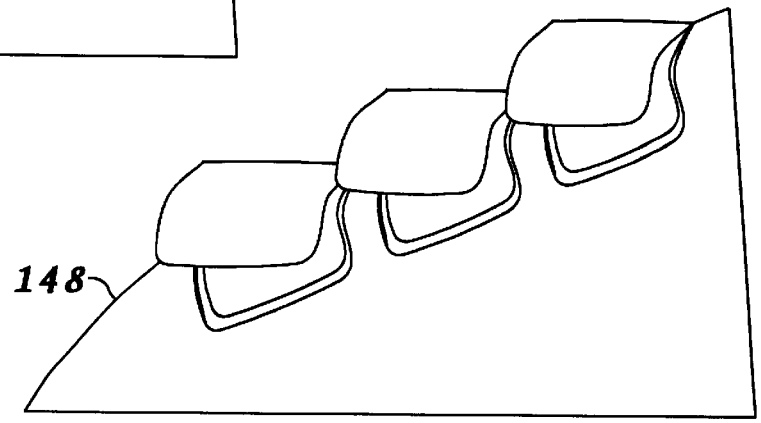
FIG. 28 is a side elevational view of the fairing shown in FIG. 27 with the door panels in an open position.

It is a requirement of the present invention that at least two openings be present within the shell assembly, although a greater number may, and generally will, be used. FIG. 1, FIG. 3, FIG. 5 and FIG. 22 depict a total of four (4) such openings. FIG. 26 depicts two (2) such openings while FIG. 28 depicts three (3) such openings. It is recognized that a greater number than four (4) may be employed in certain circumstances.

Referring now specifically to FIG. 1, FIG. 3, FIG. 5 and FIG. 11 through FIG. 16 each opening 44, 46, 50 or 54 will have an outermost forward extent 60 and an outermost rearward extent 62. The term outermost as used herein refers to those portions which contact, or come into close proximity to, outer surface 36. Each crossing member 48, 52 and 56 will have a forward brace member 64 and a rearward brace member 66 situated thereon. Additionally, shell assembly 30 will have one (1) forward brace member 64 bordering the forwardmost opening, first opening 44 in these views. Additionally, shell assembly 30 will have one (1) rearward brace member 66 bordering the rearwardmost opening, fourth opening 54 in these views.

As more fully described below each forward brace member 64 and each rearward brace member 66 will have certain features incorporated thereon which provide for the structural integrity of the respective shell assembly.

Door Panels

The door panels may be mounted in their respective openings with portions of the attachment hardware utilized to attach the door panels to the pivotal connection members visible from outside view while the door panels are in their respective closed positions. Preferably, structures will exist on the door panels to provide for a concealment of all portions of the attachment hardware utilized to attach the pivotal connection members to the door panels while the door panels are in their respective closed positions. Similarly, it is preferred to provide for a concealment of all portions of the attachment hardware utilized to attach displacement components to the door panels while the door panels are in their respective closed positions. Examples of such structures follow.

It is preferred that a contour of the outer surface of each door panel be complimentary to those surrounding surface areas of the shell assembly. The term complimentary as used herein refers to matching, or nearly matching, surface changes, either angular or slope, between a respective door panel and the shell assembly. This provide for the greatest consistency of appearance possible relative to existing fixed fairings which are widely accepted in the industry.

Referring now specifically to FIG. 2, FIG. 4, FIG. 6 through FIG. 13 and FIG. 18 through FIG. 22 shell assembly 30 is depicted having a first door panel 68, a second door panel 70, a third door panel 72 and a fourth door panel 74 mounted therein to form a fairing 76. As depicted, respective outer surfaces 78, 80, 82 and 84 of door panels 68, 70, 72 and 74 respectively conform, and are complimentary to, adjacent outer surfaces 36 of shell assembly 30 while in closed positions 86, 88, 90 and 92 respectively, (all shown in such positions in FIG. 2, FIG. 4, FIG. 6, FIG. 18 and FIG. 19). While in such closed positions, air flow, if present, may not pass through openings 44, 46, 50 or 54. As depicted openings 44, 46, 50 and 54 are exposed while respective door panels 68, 70, 72 and 74 are in open positions 94, 96, 98 and 100, (all shown in such positions in FIG. 22). While in such positions, air flow, if present, may pass through openings 44, 46, 50 and 54.

Figure 18:
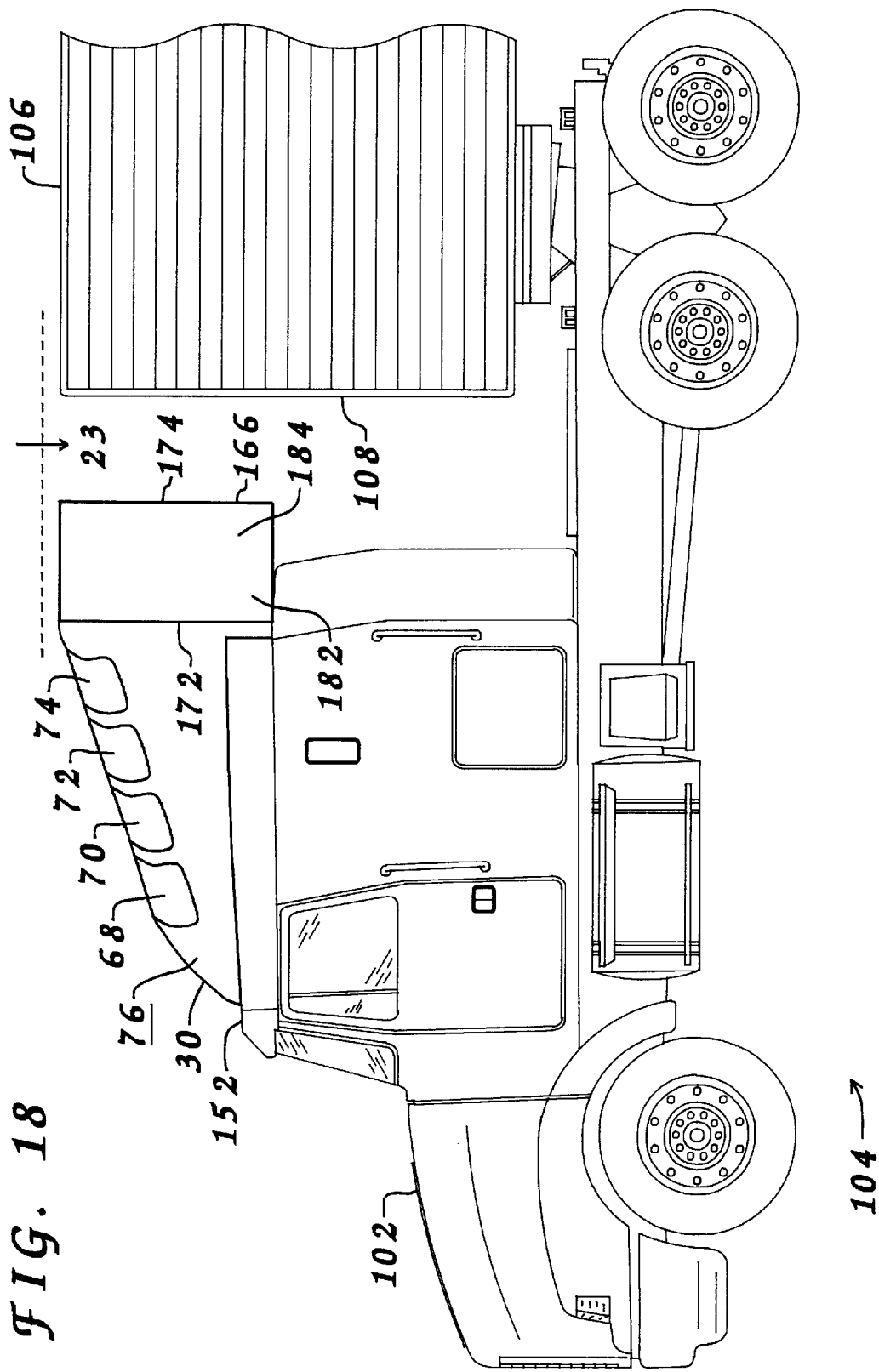
FIG. 18 is a side elevational view of a fairing assembly installed on a transport vehicle.
Figure 19:
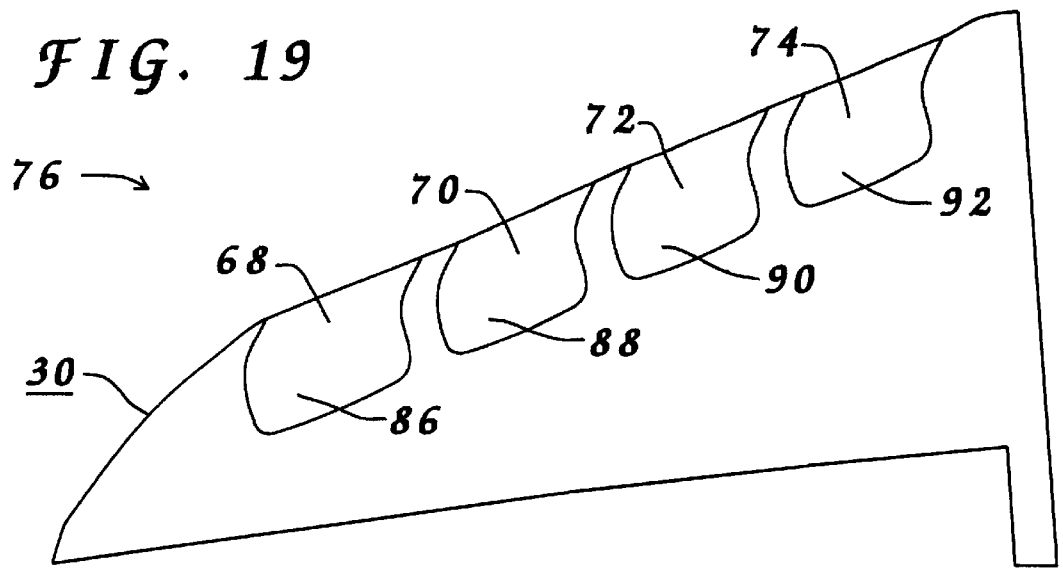
Figure 20:
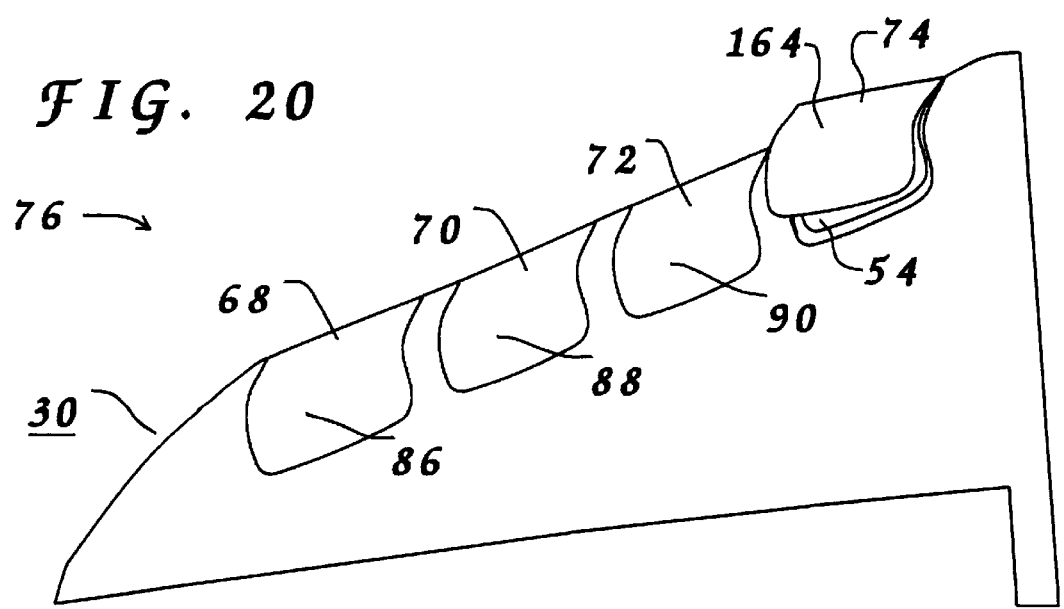

As depicted in FIG. 18 fairing 76 faces forward relative to a tractor 102 of a transport vehicle 104 wherein air flow created by movement of transport vehicle 104 is redirected to pass over and around a trailer 106. When door panels 68, 70, 72 or 74 are in their respective open position, not shown in FIG. 18, the air flow is redirected to impinge a forward face 108 of trailer 106 to exert a braking force. Such redirection of the air flow may be utilized to fulfill other useful purposes.

Figure 10:
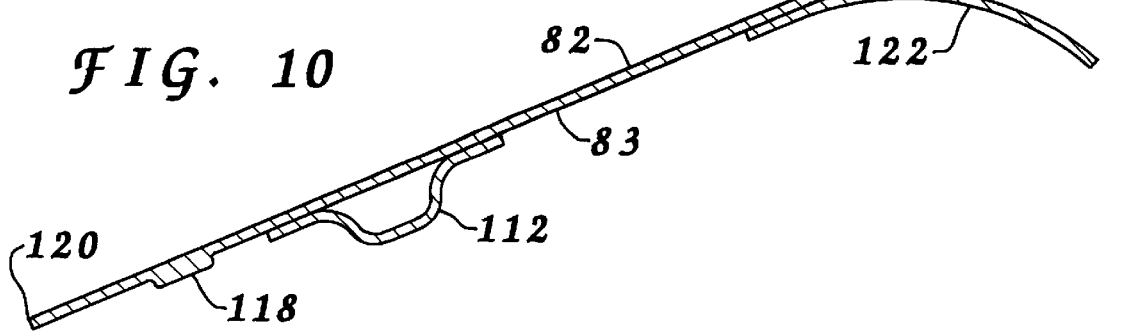
FIG. 10 is a sectional view as taken from the section line '10' shown in FIG. 7.
Figure 11:
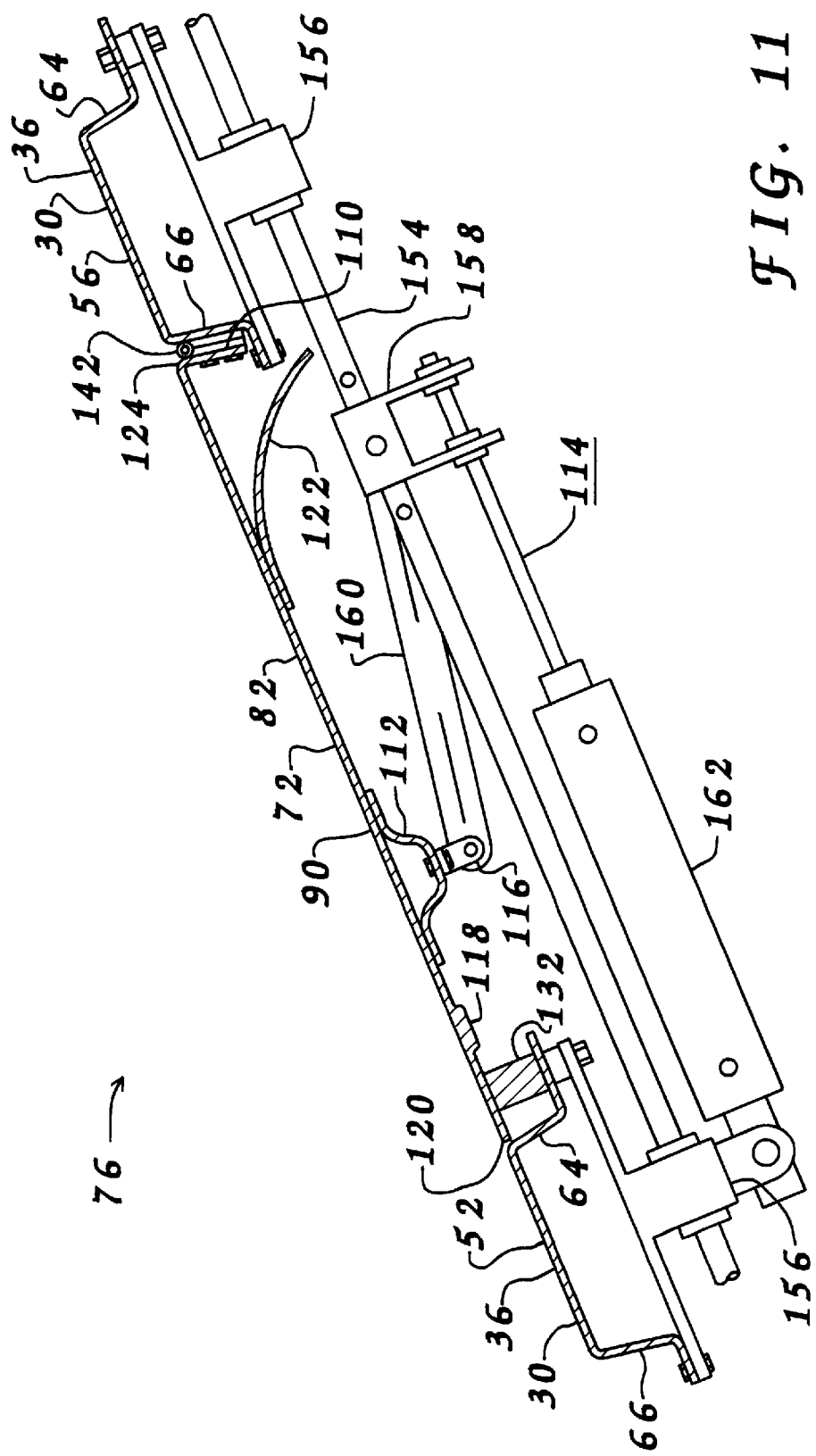
FIG. 11 is a sectional view as taken from the section line '11' shown in FIG. 2 of a portion of the shell assembly with a door panel shown installed thereon and in a closed position and with the forwardmost and rearwardmost door panels and associated elements removed.
Figure 12:
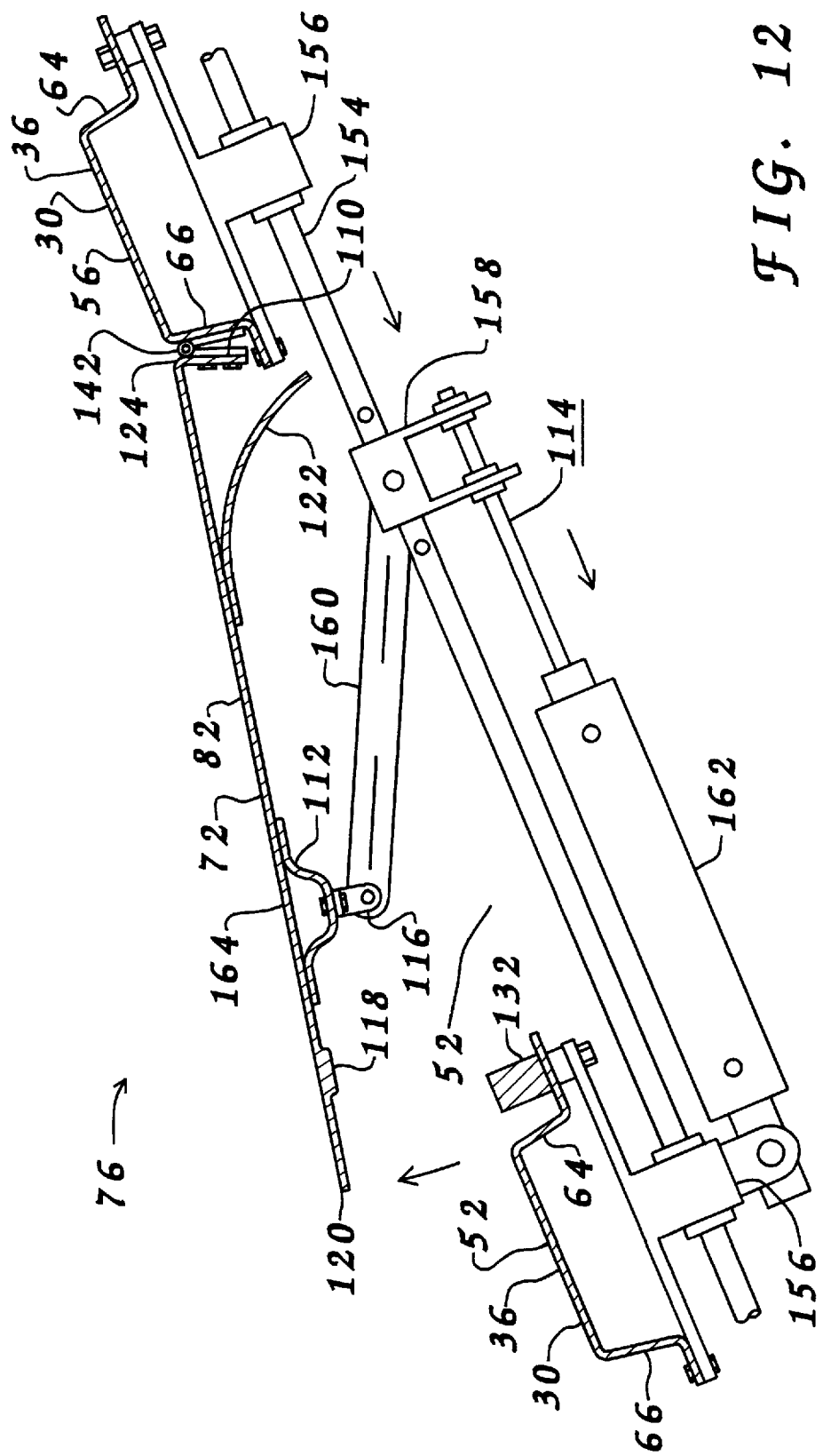
FIG. 12 is a sectional view of the assembly shown in FIG. 11 with the door panel shown in an air flow bleed position.
Figure 13:
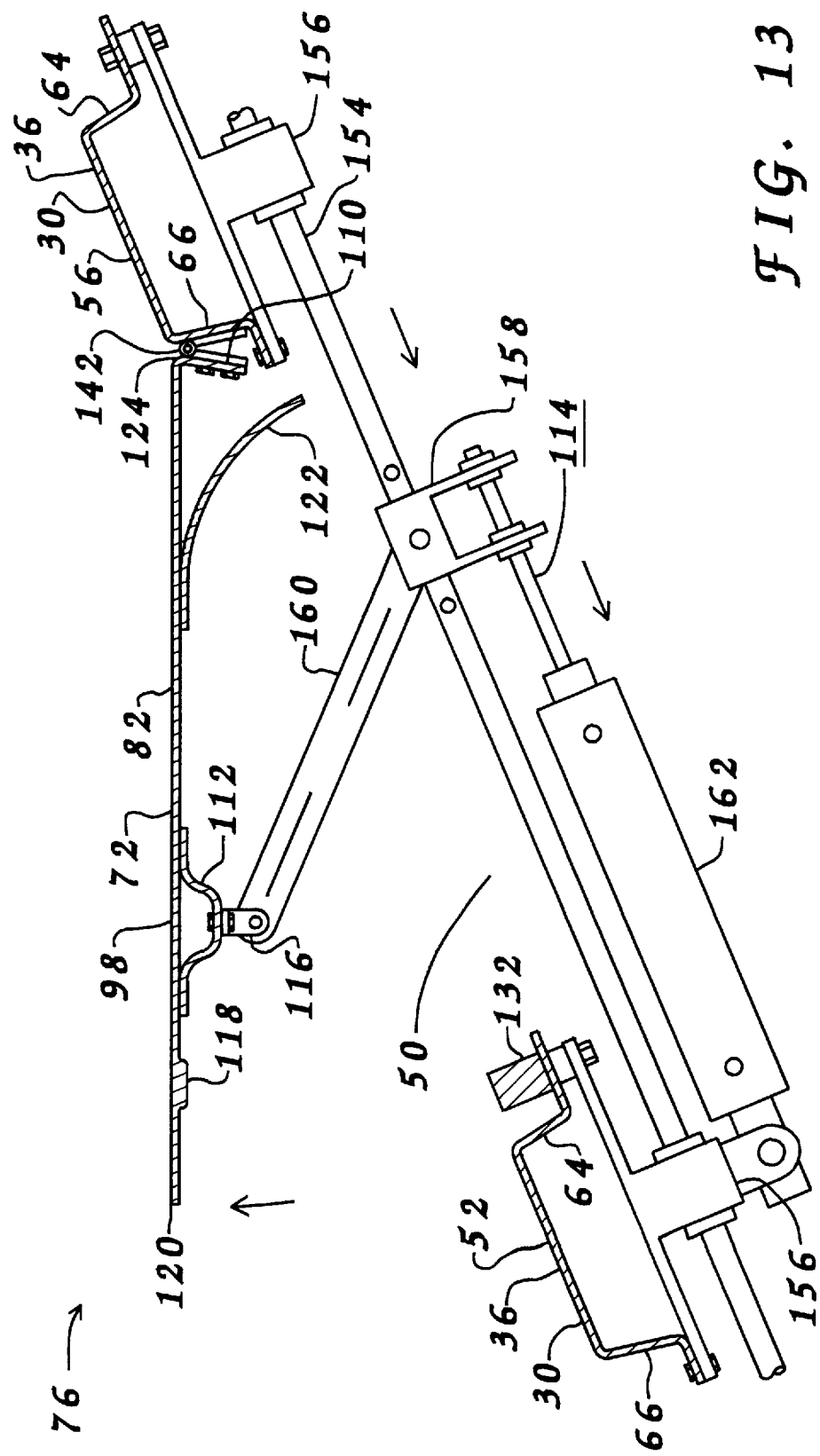
FIG. 13 is a sectional view of the assembly shown in FIG. 11 and FIG. 12 with the door panel shown in an open position.
Figure 14:
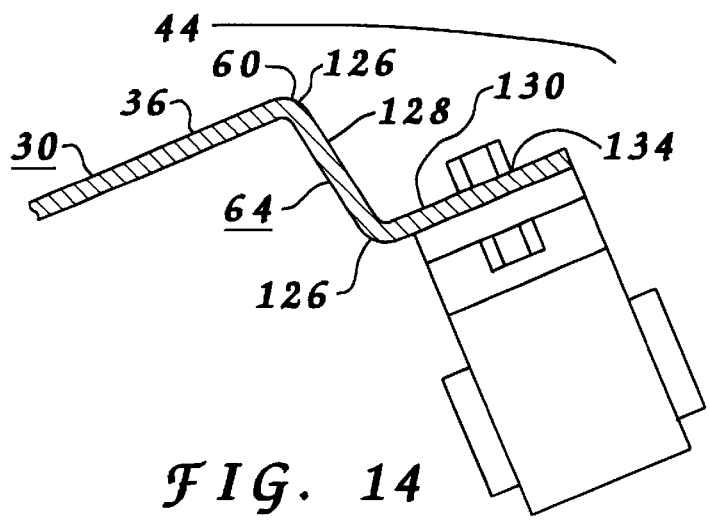
FIG. 14 is a sectional view as taken from the section line '14' shown in FIG. 2 with the door panel and associated elements removed.
Figure 15:
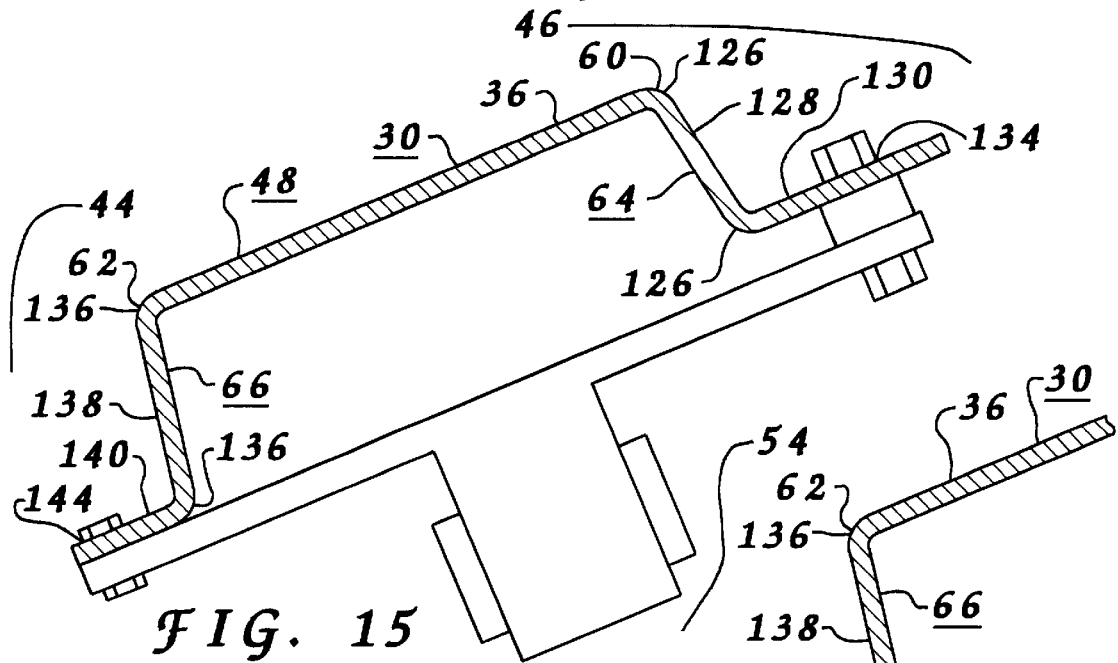
FIG. 15 is a sectional view as taken from the section line '15' shown in FIG. 2 with the door panels and associated elements removed.
Figure 16:
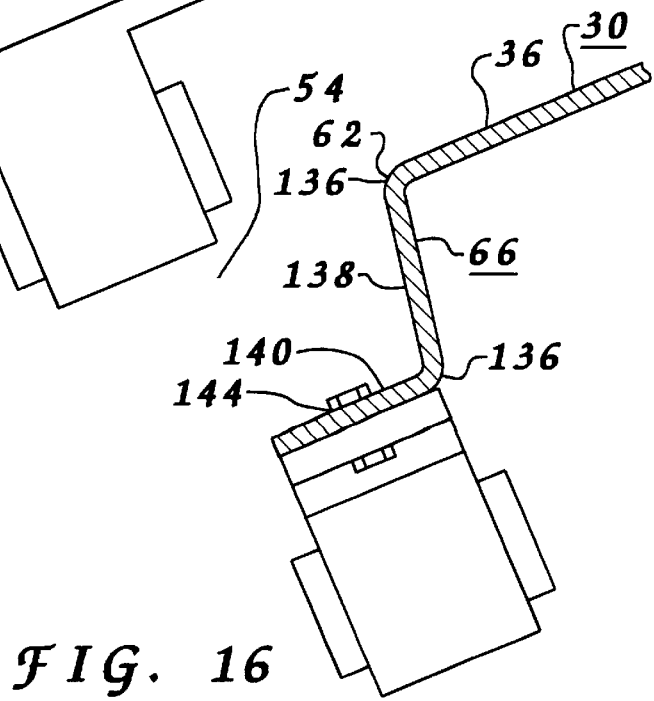
FIG. 16 is a sectional view as taken from the section line '16' shown in FIG. 2 with the door panel and associated elements removed.

As depicted in FIG. 10 specifically, but with reference to FIG. 11 through FIG. 13, certain structural configurations may be employed on third door panel 72. It being understood that third door panel 72 is exemplary of all door panels. Third door panel 72, as shown in FIG. 10, has an inner surface 83. All door panels similarly have an inner surface, not shown in any of the various views.

It is desired to provide for attachment of third door panel 72 to shell assembly 30 wherein such attachment is not readily visible from outside view. A mounting surface 110 provides for such attachment. A drive assembly coupling member 112 extends from inner surface 83 and provides for attachment of third door panel 72 to a drive assembly 114 without requiring penetration of outer surface 82 of third door panel 72. Drive assembly coupling member 112 need only extend a sufficient distance across third door panel 72 to provide for attachment of a coupling member 116.

A strengthening ridge 118 extends from inner surface 83 and provides for a reinforcing of the structural integrity of third door panel 72 adjacent a forward edge 120 to reduce any inherent tendency to twist under stress created by the air flow. Strengthening ridge 118 may extend completely across third door panel 72 or may extend across a portion of the lateral width of third door panel 72. An air flow sweep 122 extends from inner surface 83 and extends across at least a portion of a rearward edge 124 of third door panel 72 to sweep the air flow downward and prevent impingement of the air flow with mounting surface 110 or any portion of rearward brace member 66 wherein such impingement may adversely effect the streamlining of the air flow. Air flow sweep 122 may extend completely across third door panel 72 or may extend across a portion of the lateral width of third door panel 72.

Drive assembly coupling member 112, air flow sweep 122 and strengthening ridge 118 may be formed contemporaneously within inner surface 83 of third door panel 72 at the time of forming, as depicted for strengthening ridge 118. Alternatively, drive assembly coupling member 112, air flow sweep 122 and strengthening ridge 118 may be formed independently and bonded to inner surface 83 of third door panel 72 at the time third door panel 72 is formed or at any time following such forming, as depicted for drive assembly coupling member 112 and air flow sweep 122.

Structural Integrity

Fairings having moveable door panels therein experience higher levels of stress than conventional fairings. Therefore, shell assemblies having features of the present invention will have means to provide for a reinforcement of the structural integrity of the respective shell assembly. To this end shell assemblies having features of the present invention will have crossing members between each adjacent pair of openings with each crossing member having a forward brace member and a rearward brace member. Additionally, the forwardmost opening will be bordered forward by a forward brace member while the rearwardmost opening will be bordered rearward by a rearward brace member. Each brace member, either forward or rearward, will have surface directional changes thereon which ensure a high level of structural integrity to the shell assembly. These surface directional changes provide for a continuation of the outer surface of the shell assembly into each respective door opening. This results in at least a first offset surface which intersects and blends with the outer surface on each of the forward brace member and the rearward brace member. This may also result in a second offset surface which intersects and blends with one of the first offset surfaces on either the forward brace member or the rearward brace member.

Surface directional changes from a first surface to a second surface may be utilized wherein either the first surface or the second surface or both fulfills no other purpose than to enhance the structural integrity of the fairing. Preferably, surfaces adjacent a surface direction change tangent will provide features which render the surface useful for a purpose other than that of being solely for the enhancement of the structural integrity of the fairing.

Specific reference is now made to FIG. 11 through FIG. 16 which depict several forward brace members 64 and several rearward brace members 66. Each forward brace member 64 will either be a part of crossing member 48, 52 or 56 or otherwise a part of shell assembly 30 forward of first opening 44. The structural characteristics, (as defined by surface dimensions and surface directional changes), of each forward brace member 64 may be identical, as depicted, or may be radically different. This is particularly applicable with forward brace member 64 bordering first opening 44 relative to forward brace members 64 which are a part of a crossing member 48, 52 or 56 due to the different structural requirements specific to such placement. Each rearward brace member 66 will either be a part of crossing member 48, 52 or 56 or otherwise a part of shell assembly 30 rearward of fourth opening 54. The structural characteristics, (as defined by surface dimensions and surface directional changes), of each rearward brace member 66 may be identical, as depicted, or may be radically different. This is particularly applicable with rearward brace member 66 bordering fourth opening 54 relative to rearward brace members 66 which are a part of a crossing member 48, 52 or 56 due to the different structural requirements specific to such placement.

Referring now specifically to forward brace member 64, it is a requirement that at least one surface directional change 126 occur between outer surface 36 of shell assembly 30 and at least one surface of forward brace member 64, in this example a receding surface 128. Additionally, it is preferred that a second surface directional change 126 occur between the above identified surface of forward brace member 64, receding surface 128 in this example, and a second surface of forward brace member 64, in this example a seating surface 130. This surface directional change, or changes in this example, provide for a structural integrity of the resultant shell assembly, shell assembly 30 in this example. It is understood that the surfaces, exampled by surfaces 36, 128 and 130 identified herein, may each have at least one planar section, may each have at least one curved contour section or may each have a combination of at least one planar section and at least one section with a curved contour thereon.

Seating surface 130 of forward brace member 64 provides for three (3) features. The first feature of seating surface 130 is to provide for structural integrity enhancement of shell assembly 30. The second feature of seating surface 130 is to provide for a generally parallel surface to a corresponding surface on the respective door panel for secure mounting thereon of a compressible seating material as exampled by an elongated block 132, shown in FIG. 11 through FIG. 13. As depicted in FIG. 11 third door panel 72 closes third opening 50 by resting firmly against elongated block 132 while third door panel 72 is in closed position 90. The third feature of seating surface 130 is to provide for a location of attachment 134 for drive assembly 114. Receding surface 128 provides primarily for structural integrity enhancement of shell assembly 30, but also provides for displacement of seating surface 130 from outer surface 36.

Referring now specifically to rearward brace member 66, it is a requirement that at least one surface directional change 136 occur between outer surface 36 of shell assembly 30 and at least one surface of rearward brace member 66, in this example a door mounting surface 138. Additionally, it is preferred that a second surface directional change 136 occur between the above identified surface of rearward brace member 66, door mounting surface 138 in this example, and a second surface of rearward brace member 66, in this example a coupling surface 140. This surface directional change, or changes in this example, provide for a structural integrity of the resultant shell assembly, shell assembly 30 in this example. It is understood that the surfaces, exampled by surfaces 138 and 140 identified herein, may be of any of the combinations defined above for surfaces 36,128 and 130. Additionally, door mounting surface 138 may have a predominate surface configuration and have select surface areas elevated or recessed to provide for actual mounting of pivotal connection members, as exampled herein by a hinge 142.

Door mounting surface 138 of rearward brace member 66 provides primarily for a surface upon which at least one pivotal connection member, hinge 142 in this example, may be mounted, but also for structural integrity enhancement of shell assembly 30. Coupling surface 140 provides primarily for structural integrity enhancement of shell assembly 30, but also provides for a location of attachment 144 for drive assembly 114.

Resultant Aerodynamic Fairings

The combination of the shell assembly, the door panels and the transfer components required to pivotally displace the door panels within the shell assembly cooperate to form aerodynamic fairings. These fairings may be so constructed so as to have an appearance matching, or nearly matching, existing fixed fairings. As such, the resultant fairings generally will have smoothly curved surfaces thereon, as is generally accepted in the industry. Alternatively, the resultant fairings may have planar surfaces thereon or may have a combination of curved surfaces and planar surfaces. Similarly, raised sections, having either curved or planar surfaces thereon, may be utilized to produce any desired appearance envisioned.

Figure 25:
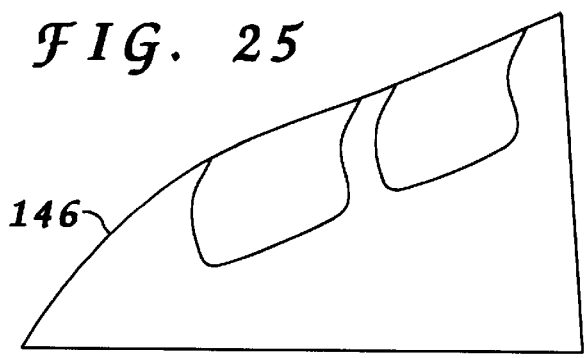
FIG. 25 is a side elevational view of a fairing having two door panels in a closed position.
Figure 27:
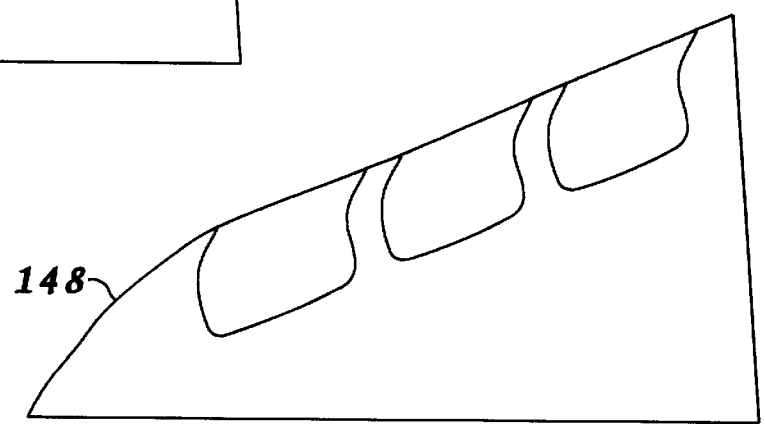
FIG. 27 is a side elevational view of a fairing having three door panels in a closed position.

As depicted each resultant fairing 76, (FIG. 2, FIG. 4, FIG. 6 and FIG. 18 through FIG. 22), 146, (FIG. 25 and FIG. 26), and 148, (FIG. 27 and FIG. 28), will have a select dimensional configuration. It is understood that each resultant fairing having features of the present invention may have any select dimensional configuration to provide a desired shaping and appearance to match known dimensional configurations of the subject transport vehicle or match known dimensional configurations of existing fixed fairings. Such fairings, including fairings 76, 146 and 148, will provide for the select redirection of air flow created by forward motion of the attached transport vehicle.

Installation on Transport Vehicle

Fairings have features of the present invention may be attached to transport vehicle using any of the numerous methods conventionally known in the art. Normally, the fairing will be attached to the transport vehicle to provide for placement above the roof area of the tractor of the transport vehicle. In certain situations it will be desirable to provide attachment to the tractor to provide for positioning extending beyond the rearward extent of the roof or even completely behind the roof area. Alternatively, it will be desirable, in certain situations, to provide for attachment to the trailer rather than the tractor.

Figure 17:
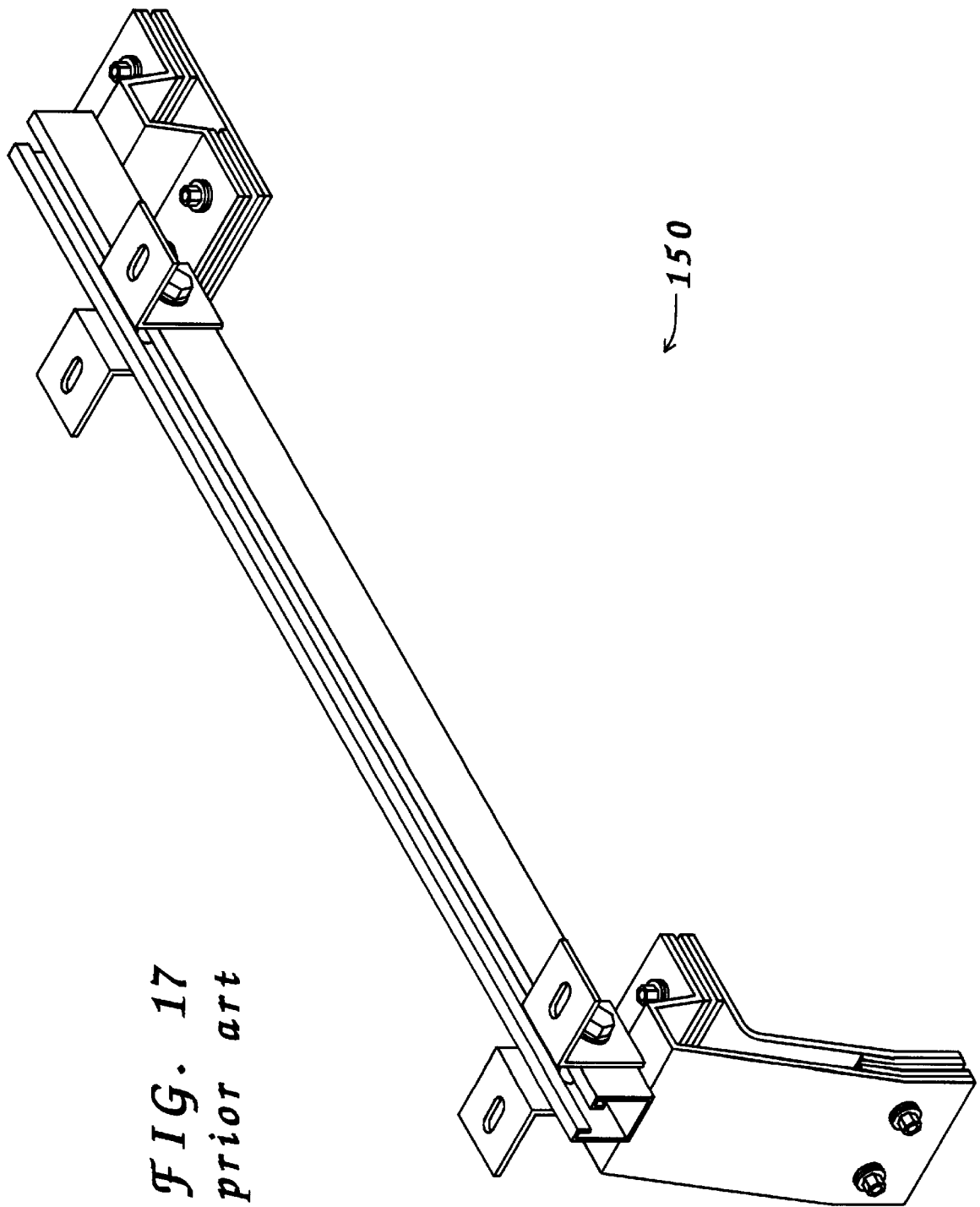
FIG. 17 is a perspective view of a prior art mounting bracket.

FIG. 17 depicts a prior art mounting bracket 150 which, in use, will normally be deployed in a matching pair on opposing lateral sides of fairing 76 to attach fairing 76 to transport vehicle 104, as shown in FIG. 18. One example of such attachment has mounting bracket 150, at a lower extent, attached to a roof 152 of tractor 102 so as to penetrate roof 152 and, directly or indirectly, at an upper extent, attached to shell assembly 30 of fairing 76.

Operation

In operation the shell assembly and the door panels cooperate to provide for selective redirection of air flow. While all of the respective door panels are in their respective closed positions this redirection is to streamline the air flow and divert the air flow around as much of the transport vehicle as possible to optimize the reduction of drag. While all of the respective door panels are in their respective open positions this redirection is to divert the air flow to cause impaction of the air flow upon the transport vehicle to optimize the creation of drag. While select door panels are in their respective open positions, or in their respective partially open positions, this redirection is to divert a select amount of the air flow for a useful purpose while maintaining the maximum reduction of drag possible in light of the select redirection.

FIG. 11 through FIG. 13 and FIG. 19 through FIG. 22 depict displacement of door panels 68, 70, 72 and 74 to provide for a redirection of air flow, if such air flow is present at the time of displacement. Many combinations of mechanical components, as conventionally known in the art, may be employed to provide for the displacement of the respective door panels 68, 70, 72 or 74. One example of such mechanical components are depicted in FIG. 11 through FIG. 13.

Each door panel, exampled by third door panel 72 in FIG. 11 through FIG. 13, will have a range of motion from closed position 90, shown in FIG. 11, to open position 98, shown in FIG. 13. This range of motion will generally occur from a single pivot point, in this example on hinge 142. Alternatively, it is conventionally known to provide for displacement of a panel wherein both ends have significant displacement. Generally, this is not desired due to the existing desire to provide for the redirected air flow to be forced to pass through the respective opening while producing the least possible turbulence within the air flow.

Drive assembly 114 has a connection rod 154 which are slidably mounted within various connection brackets 156. Connection brackets 156 are mounted to shell assembly 30. Connection rod 154 has attached thereto various linking brackets 158 which are each in turn linked to a drive bar 160 which is in turn linked to coupling member 116 which is in turn mounted to drive assembly coupling member 112 of third door panel 72. A drive 162 is linked to provide for sliding displacement of linking brackets 158 along connection rod 154 relative to shell assembly 30 which in turn causes a pivotal displacement of linked third door panel 72.

Each deployed door panel may be linked to a distinct drive assembly, all deployed door panels may be linked to a single drive assembly or select door panels may be linked to distinct drive assembly while the remaining door panels are commonly linked.

During transfer of third door panel 72 from closed position 90 to open position 98 and back to closed position 90 third door panel 72 will pass through the range of motion. It is possible to provide for a fixed positional placement at a desired placement within the range of motion as depicted by an air flow bleed position 164 shown in FIG. 12. Such positioning of third door panel 72 at a position between closed position 90 and open position 98 will provide for usage of the resultant air flow entering third opening 50 for a specific desired usage.

It is understood that all of the above examples which utilized third door panel 72 and/or third opening 50 are applicable to any of the door panels and any of the openings of fairings having features of the present invention.

Figure 23:
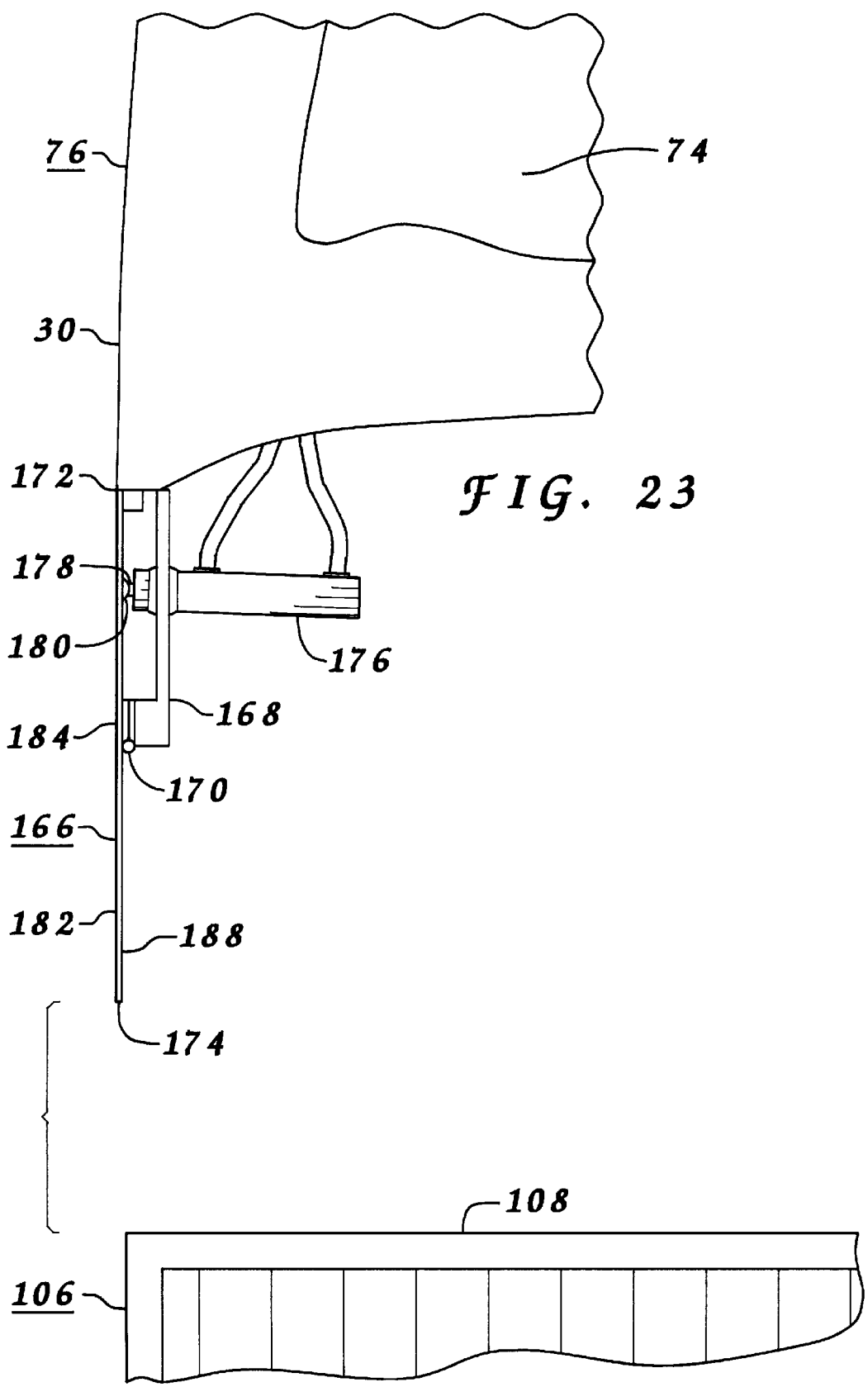
FIG. 23 is a top plan view as taken from the section line '23' shown in FIG. 18 of an assembly with a side extender in a closed position.
Figure 24:
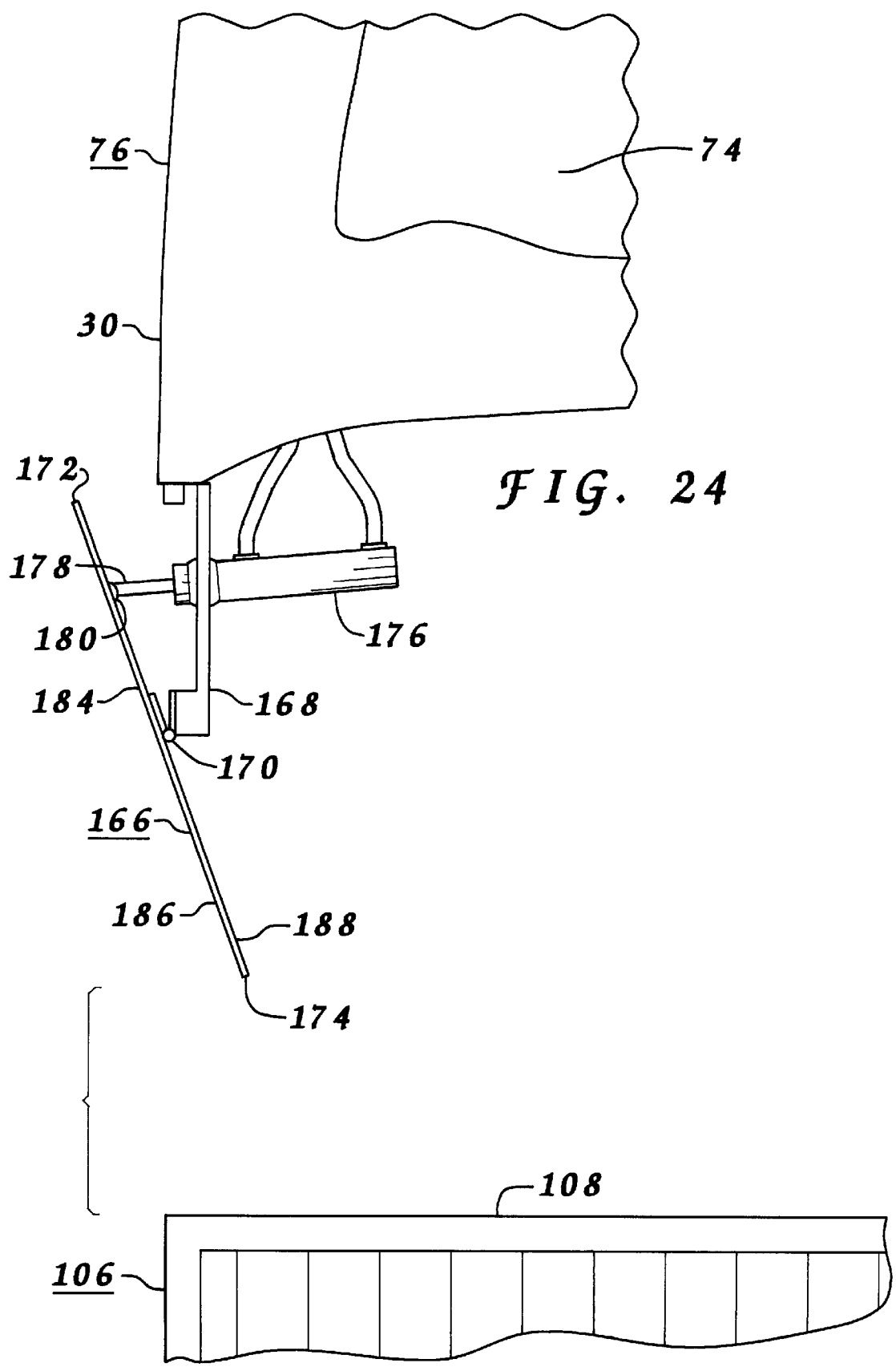
FIG. 24 is a top plan view of the assembly shown in FIG. 23 with the side extender in an open position.

Side Extenders Referring now to FIG. 18, FIG. 23 and FIG. 24 a side extender 166 is shown pivotally attached to fairing 76. In usage a second side extender would be similarly pivotally attached to the opposing side of fairing 76. During motion of transport vehicle 104 an air flow pattern is created which passes over and around transport vehicle 104. A mounting bracket 168 attaches to fairing 76 at one end and has a hinge 170 attached at the opposing end. Side extender 166 has a forward edge 172 and a rearward edge 174. Hinge 170 is attached to side extender 166 between forward edge 172 and rearward edge 174. A pneumatic drive member 176 is pivotally attached to mounting bracket 168 and has a drive rod 178 which has a distal end 180 pivotally attached to side extender 166. Side extender 166 normally has a closed position 182, shown in FIG. 18 and FIG. 23. Closed position 182 provides for an outer surface 184 of side extender 166 to provide for an extension of surface area rearward from fairing 76 to provide for a continuation of the air flow pattern passing adjacent thereto. When it is desired to redirect the air flow to impinge forward face 108 of trailer 106 side extender 166 is transferred from closed position 182 to an open position 186, shown in FIG. 24. Open position 186 provides for a portion of the air flow passing fairing 76 to pass along an inner surface 188 of side extender 166 and be angularly discharged to impinge forward face 108 of trailer 106.

The disclosed positioning of pivot of side extender 166 provides for usage of side extenders when conventional side extenders may not be readily deployed due to maximum width restrictions imposed upon the transport vehicle.

While side extender 166 is depicted as being planar along both its width and height, any shape may be employed. Normally, such dimensional configurations will be employed which match, or nearly match, those corresponding dimensional configurations of the respective fairing upon which a specific side extender is to be mounted.

Air Flow

Redirection of the air flow utilizing the door panel and opening combination, with or without the side extenders, may be used to cause the air flow to impinge forward face 108 of trailer 106, shown in FIG. 23 and FIG. 24, to exert a braking force on transport vehicle 104. Alternatively, such redirection may be utilized to provide for a cooling of components on the transport vehicle. This usage may be direct, as exampled by for a refrigeration unit mounted on the trailer, or may require ducting, as exampled to cool brake or other drive components of the transport vehicle. Redirection of the air flow utilizing the side extenders may be similarly used to exert the braking force on the transport vehicle.

With regard to exerting a braking force by redirecting the air flow, it is preferred to provide for the air flow to impinge the forward face of the trailer. This usage has several advantages including moving the drag point rearward on the transport vehicle from the more forwardly located tractor. Additionally, it prevents unnatural stress from being generated on any aspect of the transport vehicle. Therefore, such usage is the preferred method of exerting the braking effect.

Alternatively, it is possible to create the braking force within the fairing or adjacent area rearward from the fairing. This has the advantage of being applicable when the tractor is operating without a trailer in tow or when the trailer in tow lacks a flat forward face which may receive the redirected air flow and consequentially create the desired drag. A first method to implement such a deployment provides for at least partially closing the rearward extent of the fairing. A second method to implement such a deployment provides for positioning a fixed impingement surface behind the fairing. A third method to implement such a deployment provides for positioning a displaceable impingement surface behind the fairing and providing for displacement during periods of time when braking redirection of the air flow occurs.

With respect to the above description then, it is to be realized that the optimum dimensional relationships for the parts of the invention, to include variations in size, material, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A shell assembly comprising:
    a) an outer surface exposed to outside view;
    b) an outer right side,
    c) an outer left side;
    d) an outer central region residing between the outer right side and the outer left side and extending upward from a forward extent to a rearward extent;
    e) a plurality of openings in the outer central region, each opening having an outermost forward extent and an outermost rearward extent, the outermost forward extent a forward border of the opening immediately adjacent to the outer surface, the outermost rearward extent a rearward border of the opening immediately adjacent to the outer surface;
    f) integrity strengthening means comprising a crossing member situated between each adjacent pair of the openings to provide for a reinforcement of the shell assembly by providing for surface directional changes at the outermost forward extent and at the outermost rearward extent of each respective opening, each surface directional change to provide for a continuation of the outer surface to extend into the respective opening;

g) each crossing member has a forward brace member with a first offset surface intersecting the outer surface of the shell assembly and a second offset surface intersecting the first offset surface;

h) the shell assembly has a plurality of openings which are each bordered forward and rearward by the continuation of the outer surface penetrating the respective opening to provide for the reinforcement of the shell assembly;

i) further comprising a plurality of door panels and pivotal mounting means, each respective door panel substantially filling a respective opening of the plurality of the openings, the pivotal mounting means to provide for a pivotal attachment of each of the respective door panels within the respective opening, each panel defining a leading edge inner and outer surface, the inner surface being offset from the outer surface of the shell assembly substantially less than the second offset surface.

2. The shell assembly defined in claim 1 wherein each crossing member has a rearward brace member with a first offset surface intersecting the outer surface of the shell assembly and a second offset surface intersecting the first offset surface.

3. The shell assembly defined in claim 1 wherein the integrity strengthening means comprises a rearward brace member and wherein the rearward brace member has a mounting surface and pivotal mounting means for a respective door panel, the pivotal mounting means to provide for a pivotal attachment of each of the respective door panels on the mounting surface within the respective opening.

4. The shell assembly defined in claim 1 wherein the shell assembly is of a one piece construction and formed by a molding process.

5. An aerodynamic fairing for a transport vehicle to provide for a selective redirection of an air flow, the air flow created by a movement of the transport vehicle along a roadway, the aerodynamic fairing comprising:

a) a shell assembly formed by a molding process, the shell assembly comprising:
1) an outer surface;
2) an inner surface, the outer surface and the inner surface defining a thin wall therebetween;
3) a outer central region extending laterally across and longitudinally along the shell assembly, the outer central region increasing in an elevational height along a longitudinal length from a forward extent to a rearward extent;
4) a plurality of openings penetrating the thin wall in the outer central region, each opening having a forward extent and a rearward extent;
5) a forward brace member for each opening, each forward brace member to provide for a reinforcement of a structural integrity of the shell assembly and forming the forward extent of the opening and having an outer surface area being a continuation of the outer surface of the thin wall and extending into the opening;
6) a rearward brace member for each opening, each rearward brace member to provide for a reinforcement of the structural integrity of the shell assembly and forming the rearward extent of the opening and having an outer surface area being a continuation of the outer surface of the thin wall and extending into the opening;

b) a plurality of door panels, each door panel formed by a molding process, each door panel comprising:
1) an outer surface;
2) an inner surface, the outer surface and the inner surface defining a thin wall therebetween;
3) a forward edge;
4) a rearward edge;

c) mounting means to provide for each door panel to be mounted within a respective opening of the shell assembly, the mounting utilizing a pivotal connection member to attach the respective door panel in the respective opening, the pivotal connection member to provide for a pivotal attachment of the door panel to the shell assembly, the pivotal connection member attached to the respective door panel in close proximity to the rearward edge of the respective door panel, the pivotal connection member attached to the shell assembly at the rearward brace member of the respective opening in the shell assembly;

d) wherein each respective door panel further comprises a mounting flange extending at an acute angle from the inner surface of the respective door panel at the rearward edge, and each of the pivotal connection members is attached to the mounting surface of the respective door panel;

e) displacement means to provide for a pivotal displacement of select door panels within their respective openings within the shell assembly, each respective door panel having a closed position and an open position, the closed position providing for the respective door panel to substantially fill the respective opening and provide for a blocking of the air flow through the respective opening, the outer surface of the respective door panel and the outer surface of the shell assembly surrounding the respective opening being flush while in the closed position, the open position providing for a passage of the air flow through the respective opening;

whereby the aerodynamic fairing comprises the shell assembly and the plurality of door panels, the shell assembly having a plurality of openings with each opening having the forward brace member and the rearward brace member both to provide for structural integrity of the shell assembly, each of the door panels pivotally mounted within respective openings of the shell assembly while the displacement means provides for each respective door panel to be transferred between the open position and the closed position.

6. The aerodynamic fairing defined in claim 5 wherein each respective door panel further comprises an air sweep surface traversing the door panel adjacent the rearward edge and extending from the inner surface and having an increasing elevational height relative to the inner surface as the air sweep surface advances toward the rearward edge.

7. The aerodynamic fairing defined in claim 5 further comprising opposing side extenders and pivotal attachment means, each of the opposing side extenders having a forward edge and a rearward edge, the pivotal attachment means to provide for a pivotal attachment of a respective side extenders in close proximity to a respective rearward trailing side edge of the aerodynamic fairing, the pivotal attachment connecting to the respective side extender at a location between the forward edge and the rearward edge, each side extender having a closed position and an open position, the closed position to provide for an alignment of the forward edge of the respective side extender and the respective rearward trailing side edge of the aerodynamic fairing and a continuation of an existing flow pattern of the air flow along the outer surface of the aerodynamic fairing, the open position to provide for a diversion of the air flow passing the respective rearward trailing edge of the aerodynamic fairing to divert the air flow behind the respective side extender and inward on the transport vehicle.

8. An aerodynamic fairing for a transport vehicle to provide for a selective redirection of an air flow, the air flow created by movement of the transport vehicle along a roadway, the aerodynamic fairing comprising:

a) a shell assembly formed by a molding process and having an outer surface, an inner surface and a plurality of openings therebetween, each opening bounded by a forward brace member and a rearward brace member, the forward brace member to provide for a reinforcement of a structural integrity of the shell assembly and having a receding surface and a seating surface, the receding surface a continuation of the outer surface of the shell assembly, the rearward brace member to provide for a reinforcement of the structural integrity of the shell assembly and having a door mounting surface, the door mounting surface a continuation of the outer surface of the shell assembly;

b) a plurality of door panels, each door panel formed by a molding process and having an outer surface, an inner surface and a rearward edge;

c) mounting means to provide for each door panel to be mounted within a respective opening of the shell assembly, the mounting utilizing a pivotal connection member to pivotally attach the respective door panel in the respective opening, the pivotal connection member to provide for an attachment of the door panel to the shell assembly, the attachment providing for the respective door panel to be attached in close proximity to the rearward edge, the pivotal connection member attached to the shell assembly at the door mounting surface of the respective rearward brace of the respective opening in the shell assembly;

d) displacement means mounted to the seating surface to provide for a pivotal displacement of select door panels within their respective openings within the shell assembly, each respective door panel having a closed position and an open position, the closed position providing for a blocking of the air flow through the respective opening, the outer surface of the respective door panel and the outer surface of the shell assembly surrounding the respective opening being substantially flush while in the closed position, the open position providing for a passage of the air flow through the respective opening;

e) shell assembly mounting means to provide for an attachment of the shell assembly with the doors installed therein to the transport vehicle;

whereby the aerodynamic fairing comprises the shell assembly and the plurality of door panels pivotally mounted within the shell assembly.

9. The aerodynamic fairing defined in claim 8 wherein each respective door panel further comprises a mounting surface extending at an angle from the outer surface of the respective door panel at the rearward edge and at an angle from the inner surface of the respective door panel at the rearward edge, and each of the pivotal connection members is attached to the mounting surface of the respective door panel.

10. The aerodynamic fairing defined in claim 8 wherein each respective door panel further comprises an air sweep surface traversing the door panel adjacent the rearward edge and extending from the inner surface and having an increasing elevational height relative to the inner surface as the air sweep surface advances toward the rearward edge.

11. The aerodynamic fairing defined in claim 8 further comprising opposing side extenders and pivotal attachment means, each of the opposing side extenders having a forward edge and a rearward edge, the pivotal attachment means to provide for a pivotal attachment of a respective side extenders in close proximity to a respective rearward trailing side edge of the aerodynamic fairing, the pivotal attachment connecting to the respective side extender at a location between the forward edge and the rearward edge, each side extender having a closed position and an open position, the closed position to provide for an alignment of the forward edge of the respective side extender and the respective rearward trailing side edge of the aerodynamic fairing and a continuation of an existing flow pattern of the air flow along the outer surface of the aerodynamic fairing, the open position to provide for a diversion of the air flow passing the respective rearward trailing edge of the aerodynamic fairing to divert the air flow behind the respective side extender and inward on the transport vehicle.

\* \* \* \* \*